United States Patent [19]

Mandrin et al.

[11] Patent Number: 5,006,133

[45] Date of Patent: Apr. 9, 1991

[54] METHOD AND APPARATUS FOR DEOXIDATION OF SEA-WATER

[75] Inventors: Charles Mandrin, Winterthur; Rene Keller, Zell, both of Switzerland

[73] Assignee: Sulzer Brothers Limited, Winterthur, Switzerland

[21] Appl. No.: 495,838

[22] Filed: Mar. 19, 1990

[30] Foreign Application Priority Data

Apr. 5, 1989 [CH] Switzerland .................. 01252/89

[51] Int. Cl.$^5$ .................................. B01D 19/00
[52] U.S. Cl. ............................ 55/53; 55/196; 175/66; 175/206
[58] Field of Search ............... 55/46, 48, 51, 53, 196, 55/220; 175/66, 206

[56] References Cited

U.S. PATENT DOCUMENTS

| | | | |
|---|---|---|---|
| 4,136,747 | 1/1979 | Mallory et al. | 175/66 |
| 4,445,570 | 5/1984 | Retallick | 166/59 |
| 4,612,021 | 9/1986 | Bland et al. | 55/53 |
| 4,937,004 | 6/1990 | Mandrin et al. | 55/53 X |

FOREIGN PATENT DOCUMENTS 2127711  4/1984 United Kingdom .

OTHER PUBLICATIONS

Chemical Abstracts, vol. 88, No. 24, Jun. 12, 1978, p. 487, No. 88:177820k.

*Primary Examiner*—Charles Hart
*Attorney, Agent, or Firm*—Kenyon & Kenyon

[57] ABSTRACT

A method and apparatus for deoxidation of water uses a catalytic combustion chamber in which a fuel having a low ignition temperature is first delivered during a start-up phase in order to begin ignition. The fuel used for start-up may, for example, be vaporized methanol or hydrogen. After an interval of time, the fuel supplied is continuously throttled and, at the same time, an operational fuel having a higher ignition temperature is supplied in increasing quantities until the stripping gas reaches a required temperature. On completion of the start-up phase, only the operational fuel which consists of, or least contains natural gas as a component, is then fed to the catalytic combustion process.

18 Claims, 1 Drawing Sheet

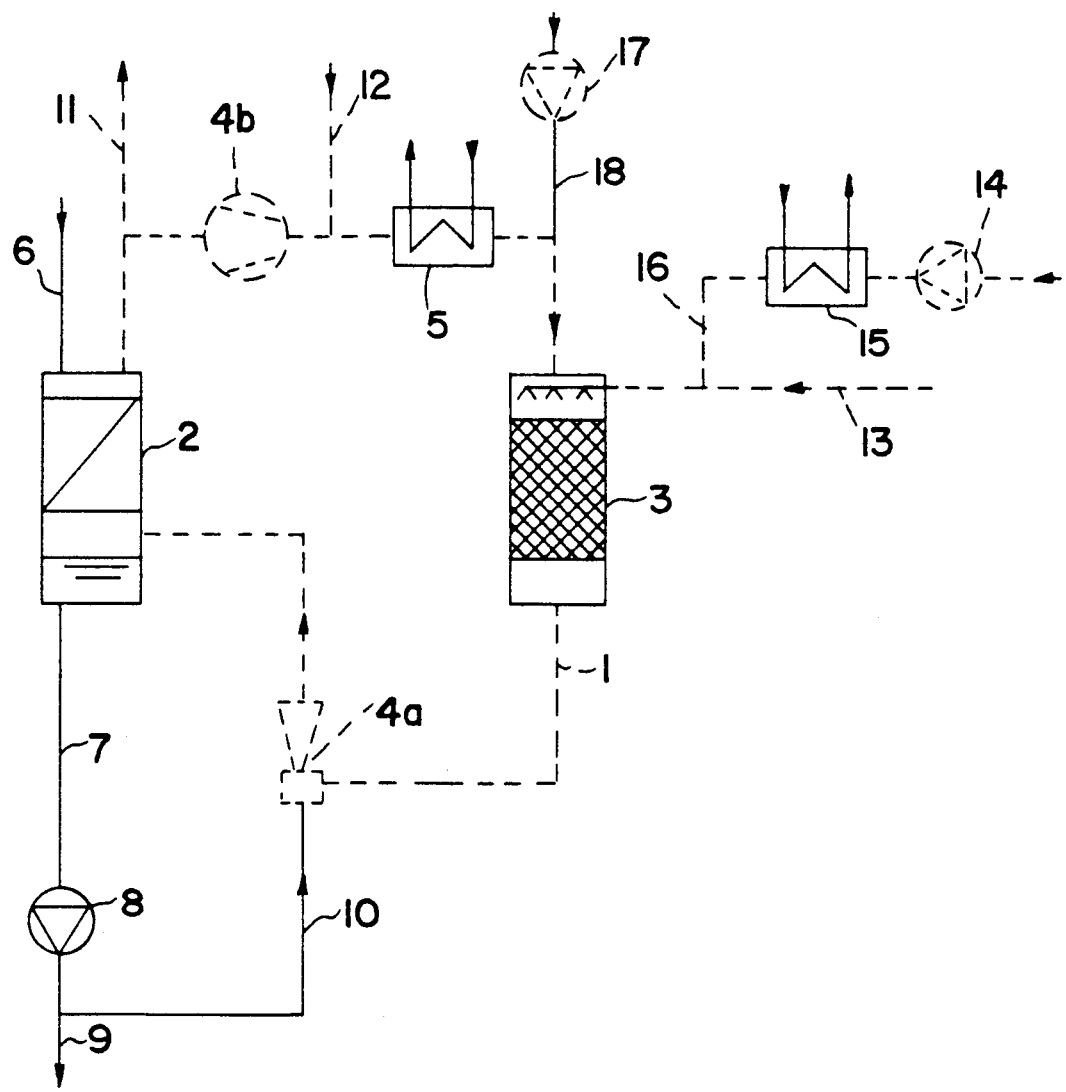

METHOD AND APPARATUS FOR DEOXIDATION OF SEA-WATER

This invention relates to a method and apparatus for deoxidation of sea-water.

Heretofore, it has been known to force oil out of oil fields or oil sources by means of a gas or water under pressure. Oil reserves of this kind are frequently found beneath the sea-bed. In such cases, the oil can be recovered by means of installations which amy be mounted on artificial islands or rigs or platforms or on ships.

It has also been known that natural sea-water contains about 10 ppm dissolved oxygen, corresponding to the partial pressure of oxygen in the atmosphere. However, this oxygen content of the sea-water is admissibly high for the purpose of forcing oil out of an oil field due, in part, to the extremely aggressive corrosion of parts of the installation and piping caused by the oxygen. In addition, there is a risk of clogging by algae which develop in large quantities with this oxygen content. Accordingly, the required sea-water must be extensively deoxidized, that is, to have not more than 20 ppb oxygen content.

Various techniques have also been known for the deoxidation of sea water. In one case, deoxidation has been performed by the use of vacuum degasification. In another case, such as described in British Patent 1,531,537 deoxidation of sea water is carried out by means of a stripping gas. In this case, the lower partial pressure of the stripping gas is not generated by a vacuum, but by the use of a substantially oxygenfree gas, e.g. natural gas or nitrogen from an air separation plant. However, the main disadvantage of using a natural gas or nitrogen source is that this results in a large consumption as compared with vacuum degasification. Also, the lower the required oxygen content of the sea water, the lower the required oxygen operating pressure of the contact apparatus. Thus, an operating pressure of less than 3 bars is required in practice. Subsequent compression is indispensable for further use of the stripping gases which are charged with oxygen and possibly with salt droplets and which are obtained at the outlet of the deoxidized sea-water separating apparatus. Even after compression, the use of the recovered gases is very limited. Thus, nitrogen containing about 0.7% oxygen is unusable for most chemical applications. Gases of this kind are also unusable for injection in methods of the kind to which the invention relates, since they contain too much oxygen.

According to British Patent 1,531,537, static mixers may be used instead of columns as the contact apparatus for stripping oxygen from the sea water. However, the required high purity of 20 ppb oxygen in the sea-water would require at least three static mixers in series. FIG. 1 of the patent specification shows an embodiment which necessitates a relatively high quantity of stripping gas. In comparison, compressors or additional pumps are required in an embodiment shown in FIG. 2 of the patent specification.

U.S. Pat. No. 4,530,820 also describes a technique for deoxidizing sea water wherein the sea water passes in counter-current to an upwardly streaming stripping gas. In this process, the oxygen rich stripping gas leaves the top of a tower and is subsequently mixed with a stream of pure hydrogen to form a mixture which is then pumped by a compressor into a catalyzing chamber. The reaction which takes pace in the catalyzing chamber results in removal of the oxygen from the gas and a heating of the stripping gas for recycling back to the stripping tower. However, such an apparatus requires the use of a compressor in similar fashion to that as described in British Patent 1,531,537.

European Patent Application 0234771 also describes a technique for treating sea water using a stripping gas. However, this technique also requires cumbersome machinery and heavy equipment such as compressors for the regeneration of the stripping gas.

U.S. patent application Ser. No. 07/303,582, filed Jan. 27, 1989 describes a technique wherein an oxygen-charged stripping gas is subject to catalytic combustion with natural gas and subsequently recycled by means of a propellant jet using the energy of the deoxidized sea water. The weight and dimensions of an apparatus using this technique play an important part, particularly on drilling platforms and ships, in the construction and use of the apparatus. Generally, the apparatus has a much lower weight than conventional plants and requires much smaller dimensions and, again, fewer components are necessary. The use of a gaseous propellant can also be restricted to a minimum.

Generally, the catalytic combustion process for the stripping gas, e.g. natural gas or nitrogen, charged with oxygen during contact with the water, should be carried out at the lowest possible temperatures, e.g. in a temperature range of a few hundred degrees C maximum, where natural gas or at least a fuel containing natural gas as a component is used in the operational state of the deoxidation plant.

Also, it is advantageous to use a catalyst bed consisting of a layer of aluminum oxide carrier particles, e.g. small cylindrical pellets into which catalyst particles of platinum or palladium are sintered.

A basic advantage of performing the catalytic combustion at low temperatures is, in particular, the fact that with these water deoxidation processes, the sensitivity of the catalyst material with respect to the relatively low oxygen concentrations of the charged stripping gas is high. Also, it is possible to achieve much lower oxygen concentrations for the stripping gas during combustion. Finally, the catalyst material has a much longer life at low temperatures than at high temperatures.

For safety reasons too, an important factor with such plants is that the combustion temperatures should be kept as low as possible, since when the gas pipelines are hot, they may be damaged, e.g. due to penetration of natural gas from the surroundings. Finally, it is generally desirable for metallurgical reasons that there should not be excessively high temperatures in the complete plant pipelines and equipment.

Under the above-indicated conditions, although it is usually possible to provide continuous operation of a plant with natural gas or with combustible gas containing natural gas as a component, it is not possible to ignite the catalytic combustion process.

Accordingly, it is an object of the invention to achieve ignition of a catalytic combustion process for the deoxidation of sea water in a reliable, inexpensive manner.

It is another object of the invention to be able to initiate a catalytic combustion process in an inexpensive manner for the start up of a deoxidation process for sea water.

Briefly, the invention is directed to a method of deoxidizing sea water in which a flow of sea water containing dissolved oxygen is passed in contact with a flow of a stripping gas capable of extracting oxygen from the sea water in order to transfer the oxygen in the sea water to the gas. Thereafter, the oxygencharged stripping gas is passed into a catalytic combustion chamber for the removal of the oxygen.

In accordance with the invention, a flow of a first fuel having a low ignition temperature is delivered to the catalytic combustion chamber during a start-up phase to initiate combustion of the oxygen in the stripping gas until a predetermined temperature is reached. Thereafter, a flow of a second fuel having a higher ignition temperature than the first fuel is delivered to the combustion chamber to maintain combustion of the oxygen of the stripping gas.

During the start-up phase, once ignition has begun, the first fuel is delivered to the combustion chamber at a decreasing rate while the second fuel is delivered to the combustion chamber at an increasing rate. This continues until the stripping gas has reached a predetermined temperature, at which time, the delivery of the first fuel ceases and only the second fuel is delivered.

Advantageously, the ignition fuel may be one of methanol or hydrogen. In the case of a drilling rig or ship, there is always a certain stock of methanol available, if only to prevent icing-up of the pipeline system under certain states of operation of the plant. However, permanent operation with methanol vapor as a combustion medium would be undesirable, particularly from the cost angle and also in terms of supplies.

When used as a combustible gas for starting up, hydrogen can be taken from cylinders since only relatively small quantities are required. Hydrogen is not recommended as a combustible gas for permanent operation because it has to be produced in an electrolyzer. An electrolyzer would make the plant much more expensive and also give rise to problems in connection with space and weight.

The invention also provides an apparatus for the deoxidation of water which is comprised of at least one contact apparatus for passing a flow of water containing dissolved oxygen in contact with a flow of a stripping gas capable of extracting oxygen from the water and a catalytic combustion apparatus for receiving the oxygen-charged stripping gas. In accordance with the invention, a first means is provided for delivering a first fuel having a low ignition temperature to the combustion chamber in order to begin combustion of the oxygen-charged stripping gas during a start-up phase as well as a second means for delivering a second fuel having a higher ignition temperature than the first fuel to the combustion chamber in order to obtain a predetermined temperature of the stripping gas at the end of the start-up phase. In addition, a delivery means is provided for recycling the oxygen-depleted stripping gas after the start up phase from the combustion apparatus to the contact apparatus in a closed circuit.

While the method and apparatus may be particularly advantageous for application to recovery of oil resources situated beneath a sea bed, the method and apparatus may also be employed on the mainland and used to deliver oil from oil resources beneath the surface of the earth. In such a case, fresh water may also be used for injection into the earth. However, in this case, such fresh water requires deoxidation before injection into the oil resources.

These and other objects and advantages of the invention will become more apparent from the following detailed description taken in conjunction with the accompanying drawing wherein:

The FIGURE schematically illustrates an apparatus constructed to employ a method according to the invention.

In the exemplified embodiment, the plant for performing deoxidation of water, more particularly sea water, comprises a closed circuit 1 for a gaseous propellant, e.g. natural gas or nitrogen.

The circuit 1 comprises essentially a contact apparatus in the form of a de-aerating column 2 for sea water, a catalytic combustion chamber 3, a jet pump 4a or a fan 4b, and a heating device 5.

In this example, the de-aerating column 2 is constructed as a counter current extraction column and may in known manner have regular packing elements of the kind described, for example, in Swiss Patents 398,503 and 617,357, or a random packing consisting, for example, of Raschig rings. Other contact devices for sea water and stripping gas may also be used to pass a flow of sea water in contact with a flow of a stripping gas, for example, static mixers followed by separating devices, the sea water and stripping gas flowing through the former in co-current. Constructions of this kind are described and illustrated, for example, in U.S. patent application Ser. No. 07/303,582.

In the present example, a feed line 6 for sea water for deoxidation is connected to the top of the deaerating column 2. The sea water, for example, has an oxygen content of about 10 ppm and is at a temperature of about 8° C. and during operation is introduced into the column 2 at a pressure of about 4 to 5 bar. After deoxidation to about 10 ppb oxygen, the sea water is fed via a line 7 to a high pressure pump 8 in which the sea water is brought to the requisite injection pressure of, for example, 100 to 250 bar. The high pressure sea water is then injected into a bore hole via a line 9.

The feed pressure in the circuit 1 can be produced by means of a jet pump 4a using deoxidized pressure water as the propellant jet fed via a line 10. From the catalytic combustion chamber 3, the jet pump 4a draws in stripping gas from which the oxygen has been substantially removed, and deliveres the gas to the deaerating column 2 in which the sea water oxygen is extracted by the stripping gas.

Instead of the jet pump 4a, however, it may be advantageous, for example, for economic reasons, to produce the required feed pressure in the circuit 1 by means of a fan 4b located between the column 2 and the heating device 5.

During operation, the stripping gas is charged with oxygen in the de-aerating column 2. A line 11 is connected to the circuit 1 at the output end of the deaerating column 2 and is used to remove a certain quantity of charged gas from the circuit in the event of excessive carbon dioxide forming during the catalytic combustion. To maintain the pressure in the circuit 1 and possibly also during the starting-up procedure to be described hereinafter, an air supply line 12 is connected to the circuit 1 downstream of the fan 4b.

As already stated hereinbefore, the catalytic combustion of the stripping gas oxygen content is to be carried out by means of natural gas or a combustible gas containing natural gas as a component, the gas being fed to a catalyst bed of the combustion chamber 3 via a line 13 or other suitable delivery means.

As illustrated, a second delivery means is provided for delivering a fuel having a low ignition temperature to the combustion chamber 3 in order to begin combustion of the oxygen-charged stripping gas during a start up phase. This means includes a metering pump 14 for metering the amount of fuel delivered to the combustion chamber 3 and a vaporizer 15 downstream of the pump 14 for vaporizing the fuel for delivery to the combustion chamber 3 via a feed line 16 which communicates with the feed line 13.

Since, however, no ignition takes place at the required relatively low temperatures, the starting-up process is carried out as indicated below.

It will first be pointed out that the general trend is to so construct the plant on the water side that the plant is independent of the natural gas or petroleum production.

To start up the plant, the procedure for a continuous operation is to feed sea water into the deaerating column 2 at the operational pressure of about 4 to 5 bar, but since the sea water during this period still has too high an oxygen content the sea water may not be injected but must be discarded.

At the same time, either the jet pump 4a or the fan 4b, if a fan is provided instead, and the heating device 5 are started up.

Instead of feeding combustible gas via the combustible gas line 13 to the catalytic combustion chamber 3, a fuel in gas or vapor form having a lower ignition temperature is used. In the present exemplified embodiment, methanol is to be used, which is introduced into the catalyst bed in a controlled flow by means of the metering pump 14 after vaporization in the vaporizer 15, the introduction being via the line 16 connected to the feed line 13.

The amount of methanol supplied is so metered that the catalyst bed does not become excessively hot, since this might result in damage.

During this phase, dissolved oxygen is introduced into the circuit stripping gas, to which end the gas is brought into contact with flowing water in the deaerating column 2. If the oxygen content of the stripping gas is inadequate, filtered compressed air can be added via line 12.

Instead of the above-described methanol supply, methanol vapor in a controlled quantity could also be supplied by means of a metering pump 17 via a line 18 connected to the circuit 1. In that case, no vaporizer is required, since the partial pressure of the methanol is so high relative to the conditions in the circuit 1 that it vaporizes.

Methanol is continuously and increasingly supplied to the catalytic combustion process for a period until the required temperature is reached. Thereafter, natural gas is fed through the line 13 as the combustible gas in a continuously increasing quantity while the methanol supply, at the same time, is reduced correspondingly by being throttled via the metering pump 14. As soon as the required catalyst bed temperature has been reached, the methanol supply is stopped and only natural gas is supplied as the combustible gas, the supply being with some excess relative to the stoichiometric conditions. At this time, the output temperature of the stripping gas is now higher than the start up temperature for the catalytic combustion.

The oxygen content of the stripping content of the stripping gas now drops to a very low value and the oxygen content of the sea water in the de-aerating column 2 is reduced, for example, to about 10 ppb.

Injection of the sea water deoxidized to the required degree can now be started.

As is known, carbon dioxide may also be removed during catalytic combustion. In this case, the amount of natural gas for catalytic combustion is greater than the stoichiometric requirement to extract oxygen relative to the solubility of the natural gas in water and the natural gas removed when the carbon dioxide is removed.

The invention thus provides a method and apparatus for the deoxidation of water, particularly sea water for use in extracting oil resources from below a sea bed or the earth.

In particular, the invention provides a method and apparatus for performing a catalytic combustion of the stripping gas used for removing oxygen from the water which is carried at the lowest possible temperatures.

The invention further provides a start-up process which allows ignition of catalytic combustion in a temperature range which is so low that the fuel which is used during normal operation and which consists of, or at least contains natural gas as a component, is not ignitable.

What is claimed is:

1. In a method of deoxidizing sea water, the steps of delivering a flow of oxygen-charged stripping gas to a catalytic combustion chamber during a start up phase;

delivering a flow of a first fuel having a low ignition temperature to the catalytic combustion chamber during said start-up phase for combustion therein with the oxygen of the stripping gas until a predetermined temperature is reached; and thereafter delivering a flow of a second fuel having a higher ignition temperaturere than said first fuel to the combustion chamber to maintain combustion of the oxygen of the delivered flow of stripping gas.

2. A method as set forth in claim 1 wherein the first fuel is delivered to the combustion chamber at a decreasing rate while the second fuel is delivered to the combustion chamber at an increasing rate.

3. A method as set forth in claim 2 wherein said second fuel includes at least natural gas.

4. A method as set forth in claim 1 wherein said first fuel is methanol in vapor form.

5. A method as set forth in claim 1 wherein said first fuel is hydrogen.

6. A method as set forth in claim 1 wherein ignition of catalytic combustion is effected in a temperature range in which natural gas is not ignitable.

7. A method for deoxidation of water comprising the steps of passing a flow of water containing dissolved oxygen in contact with a flow of a stripping gas capable of extracting oxygen from the water to transfer the oxygen in the water to the gas;

passing the oxygen-charged stripping gas into a catalytic combustion chamber;

delivering a first fuel having a low ignition temperature to the catalytic combustion chamber at the beginning of a start-up phase for combustion therein to remove the oxygen of said stripping gas; and thereafter delivering a second fuel having a higher ignition temperature than said first fuel to the combustion chamber for combustion therein during said start-up phase to maintain combustion of the oxygen of the stripping gas.

8. A method as set forth in claim 7 wherein the first fuel is delivered to the combustion chamber at a decreasing rate while the second fuel is delivered to the combustion chamber at an increasing rate during the remainder of said start-up phase until a predetermined temperature of the stripping gas is reached.

9. A method as set forth in claim 8 wherein delivery of said first fuel ceases after said predetermined temperature is reached.

10. A method as set forth in claim 9 which further comprises the step of recycling the oxygen-depleted stripping gas into contact with the flow of sea water after delivery of said first fuel ceases.

11. A method as set forth in claim 7 wherein said first fuel is one of methanol in vapor form and hydrogen.

12. A method as set forth in claim 11 wherein said second fuel is natural gas.

13. A method as set forth in claim 12 which further comprises the step of removing carbon dioxide produced during catalytic combustion.

14. A method as set forth in claim 13 wherein the amount of natural gas for catalytic combustion is greater than the stoichiometric requirement to extract oxygen relative to the solubility of the natural gas in water and the natural gas removed when the carbon dioxide is removed.

15. A method as set forth in claim 11 wherein said second fuel contains natural gas.

16. An apparatus for the deoxidation of water comprising at least one contact apparatus for passing a flow of water containing dissolved oxygen in contact with a flow of a stripping gas capable of extracting oxygen from the water;

a catalytic combustion apparatus for receiving the oxygen-charged stripping gas;

first means for delivering a first fuel having a low ignition temperature to said combustion chamber to begin combustion of the oxygen-charged stripping gas during a start-up phase;

second means for delivering a second fuel having a higher ignition temperature than said first fuel to said combustion chamber to obtain a predetermined temperature of the stripping gas at the end of said start-up phase; and a delivery means for recycling the oxygendepleted stripping gas after said start-up phase from said combustion apparatus to said contact apparatus in a closed circuit.

17. An apparatus as set forth in claim 16 wherein said first means includes a metering pump for metering the amount of said first fuel delivered to said combustion chamber and a vaporizer downstream of said pump for vaporizing said first fuel for delivery to said combustion chamber.

18. An apparatus as set forth in claim 17 which further comprises a line for adding oxygen to the flow of stripping gas upstream of said combustion chamber.

* * * * *